March 22, 1927.
A. M. DRAKE
1,622,234
SPINDLE ATTACHMENT
Filed April 24, 1925
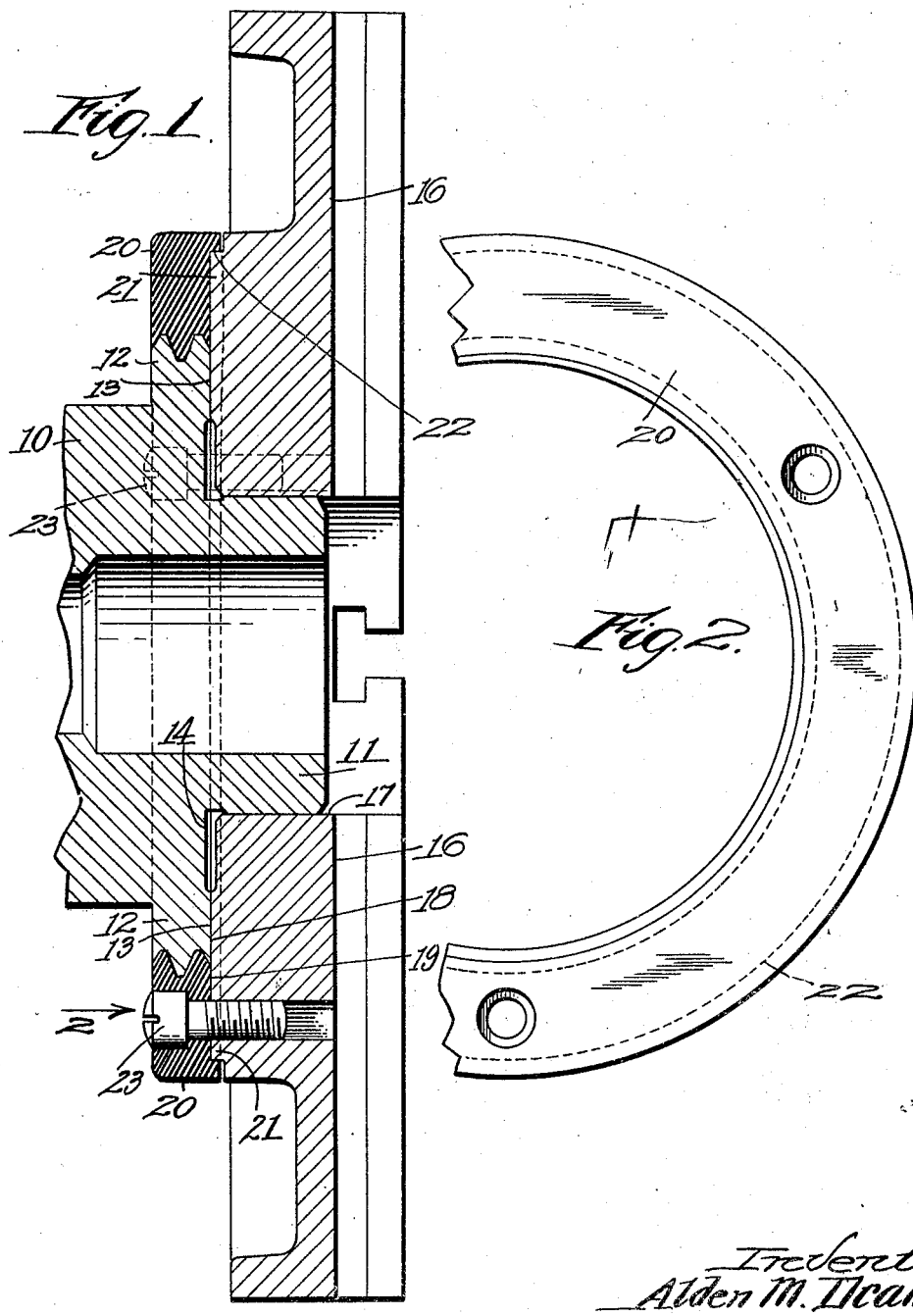
Inventor
Alden M. Drake
By attorneys
Southgate Fay & Hawley
Witness
C. F. Wesson Patented Mar. 22, 1927.

1,622,234

UNITED STATES PATENT OFFICE.

ALDEN M. DRAKE, OF GREENFIELD, MASSACHUSETTS, ASSIGNOR TO GREENFIELD TAP AND DIE CORPORATION, OF GREENFIELD, MASSACHUSETTS, A CORPORATION OF MASSACHUSETTS.

SPINDLE ATTACHMENT.

Application filed April 24, 1925. Serial No. 25,720.

This invention relates to a spindle attachment adapted for use in lathes, grinding machines, drill presses or other machines in which it is necessary to removably secure face plates, chucks, or other detachable parts to the end of a rotatable spindle.

The usual method of attachment is to provide a screw thread of relatively large diameter at the end portion of the spindle and to provide corresponding internal threads on the attachment to be mounted on the spindle. In many machines large numbers of different attachments are used on the spindles and it is a matter of considerable trouble and expense to cut an accurate internal thread of large diameter on each attachment.

One of the objects of my invention is to reduce the expense of making such attachments by providing a separate attaching ring, internally threaded to fit the spindle and adapted to be successively mounted on any number of different attachments.

A further object of my invention is to provide a spindle having a cylindrical axial projection by which an attachment may be accurately centered. The internal thread of the ring preferably has a relatively loose fit on the spindle and the ring is used mainly for drawing the parts together and not for centering or aligning the attachments.

A preferred form of the invention is shown in the drawings in which—

Fig. 1 is a sectional side elevation of a portion of a spindle with my improvements applied thereto; and Fig. 2 is a partial side elevation of the attaching ring.

Referring to the drawings, I have shown a portion of a spindle 10 such as is commonly used in lathes and grinding machines and in other more or less similar machines. This spindle 10 is provided with a cylindrical projection 11 and with an externally threaded portion or flange 12. The outer face of the portion 12 is accurately finished, as indicated at 13. For convenience of manufacture, a recess 14 is preferably provided, as indicated, between the surface 13 and the projection 11.

The face plate or other attachment 16 is provided with an axial opening 17 closely fitting the projection 11 and centering the attachment on the spindle. The attachment is also preferably provided with a finished surface 18, a portion of which engages the surface 13 previously described, and a portion of which engages a finished surface 19 on an attaching ring 20.

The surface 18 of the attachment is preferably formed on a slight cylindrical projection 21 of the attachment, and the ring 20 has a corresponding circular recess 22 to receive the projection 21.

The ring 20 is thus accurately centered upon the attachment 16 and may be firmly secured thereto by a plurality of screws 23 or in any other convenient manner. The attaching ring 20 is provided with internal screw threads which are preferably a somewhat loose fit for the external threads of the portion 12 of the spindle. The loose fit of the threads is such as to permit the attachment to be centered and aligned by the projection 11, rather than by the threads of the ring 20. Great accuracy in the formation of the threads is thus rendered unnecessary.

When an attachment is assembled with the spindle, it is accurately centered by its opening 17 on the projection 11 of the spindle and is firmly drawn against the finished surface 13 by the co-operation of the external and internal screw threads. The centering and alignment of the attachment is mainly determined by the projection 11 and not by the threaded ring 20.

When a different attachment is to be substituted, it is merely necessary to remove the old attachment, transfer the ring 20 to the new attachment, and then place the new attachment on the spindle. When a new attachment is made, it is merely necessary to provide the new attachment with an axial opening 17 and with a slight cylindrical projection 21 having an accurately finished plane surface 18.

The new attachment is thus very easily manufactured in any ordinary machine shop and the troublesome job of producing an accurate internal thread of large diameter is entirely avoided. It is thus possible for the owner of a machine to provide himself at small cost with any desired number of attachments for his machine, all of which will be firmly secured and accurately centered when in use.

Having thus described my invention and the advantages thereof, I do not wish to be limited to the details herein disclosed otherwise than as set forth in the claims, but what I claim is:—

1. In a machine, a rotatable spindle having a relatively thin externally threaded end flange portion of substantially larger diameter than said spindle, an attachment for said spindle, an internally threaded ring of corresponding thinness and diameter detachably secured to said attachment and loosely fitting the threaded end portion of said spindle to permit slight relative adjustment of the parts, and additional means to accurately center said attachment on said spindle.

2. In a machine, a rotatable spindle having an externally threaded end portion, an attachment for said spindle, an internally threaded ring centered on said attachment and loosely fitting the threaded end portion of said spindle to permit slight relative adjustment of the parts, and means to detachably secure said ring to said attachment, the end portion of said spindle having a cylindrical projection and said attachment having an axial opening closely fitting said projection and accurately centering said attachment.

3. A construction as set forth in Claim 2, in which said attachment has a slight cylindrical projection on its face adjacent said spindle, and in which said ring has a circular recess closely fitting said cylindrical projection and thereby centering said ring on said attachment.

In testimony whereof I have hereunto affixed my signature.

ALDEN M. DRAKE.